US009874305B2

(12) United States Patent
Lowry et al.

(10) Patent No.: US 9,874,305 B2
(45) Date of Patent: Jan. 23, 2018

(54) MULTI-APPENDAGE DEVICE FOR HOLDING, GRIPPING, OR SUSPENDING AN OBJECT

(71) Applicant: OctoGrip, LLC, Pembroke, NC (US)

(72) Inventors: Donna Rena Lowry, Pembroke, NC (US); Raeshon Lamont McNeil, Charlotte, NC (US); Juan Carlos Perez, Charlotte, NC (US); Nicholas Preston Baker, Gastonia, NC (US); Heyward Alexander Moore, Charlotte, NC (US)

(73) Assignee: OctoGrip, LLC, Pembroke, NC (US)

( * ) Notice: Subject to any disclaimer, the term of this patent is extended or adjusted under 35 U.S.C. 154(b) by 0 days.

(21) Appl. No.: 14/625,611

(22) Filed: Feb. 18, 2015

(65) Prior Publication Data

US 2016/0236111 A1    Aug. 18, 2016

(51) Int. Cl.
*A63H 3/04* (2006.01)
*A63H 3/00* (2006.01)
(Continued)

(52) U.S. Cl.
CPC ............. *F16M 11/40* (2013.01); *A63H 3/003* (2013.01); *A63H 3/005* (2013.01); *A63H 3/04* (2013.01);
(Continued)

(58) Field of Classification Search
CPC . A63H 3/00; A63H 3/003; A63H 3/04; A63H 3/005; A63H 9/00; A63H 33/00; F16M 11/00; F16M 11/40
See application file for complete search history.

(56) References Cited

U.S. PATENT DOCUMENTS 2,134,974 A * 11/1938 Hurwitz .................... A47F 8/00
                                                           223/78
5,288,044 A    2/1994 Chen
(Continued)

FOREIGN PATENT DOCUMENTS

EP          0566799 A1 * 10/1993 ................ A63H 3/04
JP      2001346623 A  * 12/2001 ........... A45F 5/1026
WO   WO 2014075015 A1 *  5/2014 ............. A47G 29/10

OTHER PUBLICATIONS

International Search Report (ISR) and Written Opinion (WO) by the USPTO as ISA in PCT/US2016/018546 corresponding to the present application, dated May 2, 2016, 22 pages.

*Primary Examiner* — Gene Kim
*Assistant Examiner* — Alyssa Hylinski
(74) *Attorney, Agent, or Firm* — Tillman Wright, PLLC; Chad D. Tillman; Jeremy C. Doerre

(57) ABSTRACT

A multi-appendage device for holding, suspending, or gripping an object. The device includes: a body, and a plurality of flexible appendages attached to and extending from the body. Each appendage in turn includes an elongate integral piece of molded material, and an elongate integral piece of material that is located within an interior of the elongate integral piece of molded material, and that is generally flexible and inelastic. In accordance with this aspect, each appendage is bendable into various different shapes and is generally inelastic so as to remain in a shape into which it is bent. Preferably, the device further includes an add-on component that attaches to the body to extend from a top of the body and serve as a handle. Alternatively or additionally, the add-on component may include a light, a storage compartment, or both.

26 Claims, 5 Drawing Sheets

(51) Int. Cl.
  *F16M 11/40*  (2006.01)
  *F16M 11/24*  (2006.01)
  *B65D 43/02*  (2006.01)

(52) U.S. Cl.
  CPC ..... *B65D 43/0204* (2013.01); *B65D 43/0225* (2013.01); *F16M 11/242* (2013.01)

(56) References Cited

U.S. PATENT DOCUMENTS

| | | | | |
|---|---|---|---|---|
| 5,451,176 | A * | 9/1995 | Beltman | A63H 3/005 206/457 |
| 5,599,001 | A * | 2/1997 | Dwyer | A61M 5/1418 248/505 |
| D410,971 | S * | 6/1999 | Young | D21/398 |
| 6,749,166 | B2 | 6/2004 | Valentine et al. | |
| 6,790,398 | B1 * | 9/2004 | Ejima | A63H 3/04 264/251 |
| D573,662 | S * | 7/2008 | Behn | D21/398 |
| D634,372 | S * | 3/2011 | Garofalo | D21/398 |
| 7,959,116 | B2 * | 6/2011 | Carnevali | F16M 11/14 248/163.1 |
| 8,197,149 | B2 | 6/2012 | Darrow | F16M 11/041 248/168 |
| D679,122 | S * | 4/2013 | Rojas | D6/525 |
| 8,696,153 | B2 | 4/2014 | Bevirt | |
| 9,341,306 | B2 * | 5/2016 | Amussen | F16M 11/40 |
| 2002/0022431 | A1 * | 2/2002 | Schneider | A63H 3/005 446/73 |
| 2002/0109053 | A1 | 8/2002 | Lemieux et al. | |
| 2002/0195528 | A1 * | 12/2002 | Overbeck | B64C 9/26 244/214 |
| 2003/0218105 | A1 * | 11/2003 | Sones | A61J 9/0692 248/104 |
| 2006/0151409 | A1 * | 7/2006 | Schmoelzer | A47G 25/06 211/85.9 |
| 2007/0154254 | A1 | 7/2007 | Bevrit | |
| 2008/0155788 | A1 * | 7/2008 | Wilcox | A43B 3/0078 24/3.1 |
| 2008/0283697 | A1 * | 11/2008 | Darrow | B60R 11/02 248/163.1 |
| 2008/0304257 | A1 * | 12/2008 | Opolka | F21S 9/02 362/191 |
| 2009/0039213 | A1 | 2/2009 | Darrow | |
| 2010/0021155 | A1 | 1/2010 | Orzeck et al. | |
| 2012/0019113 | A1 * | 1/2012 | Hale | G06F 1/1628 312/223.1 |
| 2012/0305509 | A1 * | 12/2012 | Benson | A63H 33/006 211/85.7 |
| 2012/0309256 | A1 * | 12/2012 | Theodore | F16M 11/041 446/72 |
| 2013/0134264 | A1 * | 5/2013 | Carter, Jr. | B64C 27/025 244/7 A |
| 2013/0193909 | A1 * | 8/2013 | Blevins | F16M 11/10 320/107 |
| 2014/0227933 | A1 * | 8/2014 | Bagla | A63H 3/02 446/73 |
| 2014/0346306 | A1 * | 11/2014 | Mayfield | A47B 23/043 248/455 |
| 2015/0289399 | A1 * | 10/2015 | Liao | H05K 7/1417 361/747 |
| 2015/0358044 | A1 * | 12/2015 | Barstead | H04B 1/3888 455/575.1 |

* cited by examiner

MULTI-APPENDAGE DEVICE FOR HOLDING, GRIPPING, OR SUSPENDING AN OBJECT

COPYRIGHT STATEMENT

All of the material in this patent document, including source code, is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

BACKGROUND OF THE INVENTION

The present invention generally relates to devices for holding, gripping or suspending objects and, more particularly, to a device having multiple appendages for holding, gripping or suspending an object.

A device is known for holding a camera or smartphone that has three legs. Such device is sold under the trademark JOBY and currently is available for purchase, for instance, online at joby-dot-com. Further, it is believed that such device is disclosed in U.S. Patent Application Publication No. 2007/0154254.

While such device is believed to be acceptable for its intended purpose, it is believed that one or more needs nevertheless exist for improvements in the field of devices for holding, gripping or suspending objects, and that the invention provides one or more advantages and benefits otherwise not provided by such conventional devices.

SUMMARY OF THE INVENTION

The present invention includes many aspects and features.

Accordingly, one aspect of the present invention relates to a multi-appendage device for holding, suspending, or gripping an object. The device comprises: a body, and a plurality of flexible appendages attached to and extending from the body. In accordance with this aspect, each appendage is bendable into various different shapes and is generally inelastic so as to remain in a shape into which it is bent.

In features of this aspect, each respective appendage may comprise a sequence of ball-and-arm sections, each arm section extending between two ball sections of the respective appendage; and each respective appendage may comprise a sequence of ten ball-and-arm sections, each an arm section extending between two ball sections of the respective appendage.

Further with respect to this aspect, each appendage in turn preferably comprises an elongate integral piece of molded material, and an elongate integral piece of material that is located within an interior of the elongate integral piece of molded material, and that is generally flexible and inelastic.

In another feature of this aspect, the elongate integral piece of molded material of each appendage generally extends an entire length of the appendage.

With respect to such feature, the elongate integral piece of material that is located within an interior of the elongate integral piece of molded material of each appendage may generally extend the entire length of the appendage.

With respect to such feature, the elongate integral piece of material that is located within an interior of the elongate integral piece of molded material of each appendage comprises an embedded strand—such as an embedded wire, cable, or rod—that generally extends the entire length of the appendage.

In another feature of this aspect, the elongate integral piece of molded material of each appendage is generally elastic.

With respect to this feature, the elongate integral piece of molded material of each appendage may comprise an elastomer.

With respect to this feature, the elongate integral piece of molded material of each appendage may define a generally resilient exterior outer surface of the appendage, and each appendage may comprise a molded elastomeric surface.

In a feature of this aspect, each of the plurality of appendages comprises an elastomer that is molded about an elongate member.

With respect to such feature, the elongate member may comprise a flexible wire that is capable of being bent and shaped.

With respect to such feature, the elongate member may comprise a flexible cable that is capable of being bent and shaped.

In a feature of this aspect, at least one appendage includes a distal end having a suction cup enabling suctioning attachment and stabilization of the appendage to a surface.

In a feature of this aspect, at least one appendage includes a distal end having a fastener enabling fastening and stabilization of the appendage to an object.

With respect to such feature, the fastener may comprise a clamp.

With respect to such feature, the fastener may comprise a spring-biased clip.

In a feature of this aspect, at least one appendage includes a distal end having a magnetic component enabling magnetic attachment and stabilization of the appendage to a surface.

In a feature of this aspect, at least one appendage includes a distal end having a magnet enabling magnetic attachment and stabilization of the appendage to a surface.

In a feature of this aspect, each appendage snaps into engagement with the body.

In a feature of this aspect, the appendages are detachable from a body and are interchangeable with each other in attachment to the body.

In a feature of this aspect, each appendage is spaced at generally equal distant to each appendage adjacent thereto.

With respect to such feature, the plurality of appendages may comprise six appendages.

With respect to such feature, the plurality of appendages may consist of eight appendages.

In yet another feature of this aspect, each appendage is structurally the same as each other appendage.

In a feature of this aspect, the body has a generally flat top wall, and further comprising a layer of resilient material located on the generally flat top wall.

With respect to this feature, the appendages may extend from sides of the body, and the body may be dimensioned and configured to be grasped by, and fit within the palm of, a person's hand, with the layer of resilient material facing the palm of the hand.

With respect to this feature, the resilient layer of material may be a molded material.

In a feature of this aspect, the device further comprises an add-on component attached to the body.

With respect to this feature, the add-on component may extend from a top of the body.

With respect to this feature, the add-on component may snap onto the body.

With respect to this feature, the add-on component may comprise a handle.

With respect to this feature, the add-on component may be dimensioned and configured to be grasped by, and fit within the palm of, a person's hand, the add-on component serving as a handle of the device.

With respect to this feature, the add-on component may resemble a head; the body and the head may resemble a character. Preferably, the head, the body, and the appendages resemble an octopus (as shown for example in FIG. 1), and the device is made available in a variety of different colors.

Further with respect to this feature, the add-on component may comprise a light.

With respect to this feature, the add-on component may comprise a storage compartment, wherein the add-on component may comprise a lid for closing and securing any item in the storage compartment, and the lid may be a screw-on lid or a snap-on lid. Alternatively or additionally, the add-on component may comprise a zipper arrangement for closing and securing any item in the storage compartment.

With further respect to this feature, the add-on component preferably is detachable and reattachable to the body.

In a feature of this aspect, the device further comprises a first add-on component attached to the body and a second add-on component detached from the body, wherein the first add-on component is detachable and reattachable to the body, and wherein the second add-on component is attachable to and detachable from the body when the first add-on component is detached from the body, whereby the first and second add-on components are interchangeable in attachment to the body.

In a feature of this aspect, the device further comprises an object itself that is releasably held by a subset of the appendages that serve as arms, the arms being bent into a shape that grips the object, and wherein a subset of other appendages serve as legs that support the device on a surface. The arms preferably are wrapped around or otherwise about the object in locking engagement with the object.

In a feature of this aspect, the device further comprises an object itself that is releasably held by a subset of the appendages that serve as arms, the arms being bent into a shape that grips the object; wherein the object is held by a subset of the appendages; and wherein a subset of other appendages releasably mount the device to a structure or other object. The arms preferably are wrapped around or otherwise about the object in locking engagement with the object.

In a feature of this aspect, the device further comprises an object itself that is releasably held by a subset of the appendages that serve as arms, the arms being bent into a shape that grips the object; wherein an object is held by a subset of the appendages; and wherein a subset of other appendages releasably suspend the device from a structure or other object. The arms preferably are wrapped around or otherwise about the object in locking engagement with the object.

In a feature of this aspect, the device further comprises a plurality of sockets each defining a recess for receiving a ball-shaped object; wherein each appendage comprises a ball-shaped end; and wherein each appendage is attached to the body by way of the ball-shaped end being received within a recess of a respective said socket.

With respect to this feature, each of the plurality of sockets is defined by a respective recess formed in the body.

With respect to this feature, each of the plurality of sockets comprises a respective mounting component that is attached to the body and, specifically, to a base component of the body, the mounting component defining a respective socket. Each appendage may be removably received within a recess of a respective said socket; and each of the plurality of mounting components may be detachable and reattachable to the base component, wherein the mounting components may be interchangeable with each other in attachment to the base component.

In a feature of this aspect, each appendage is configured to be popped into engagement with the body via a ball-and-socket connection and thereby held in attachment thereto.

In a feature of this aspect, each appendage is configured to be popped out of the ball-and-socket connection with the body for detachment of the appendage from the body.

With respect to this feature, each appendage is configured to be reattached to the body by being popped back into a ball-and-socket connection with the body and thereby held in attachment thereto. Each respective appendage may be detachable from and reattachable to the body by popping the respective appendage into and out of a respective recess of the body that defines a socket for the respective appendage.

In a feature of this aspect, the body has a diameter of between about one and one-half inches to about two inches.

In a feature of this aspect, each appendage has a length of between about six inches and eight inches.

In a feature of this aspect, the device stands on its own by way of one or more of the appendages.

In a feature of this aspect, the body is generally circular in a cross-sectional profile that has a diameter of between about one and one-half inches and about three inches.

Another aspect of the invention comprises a method of using a device in accordance with a foregoing aspect to hold a plurality of objects.

Another aspect of the invention comprises a method of using the device in accordance with a foregoing aspect to suspend a plurality of objects.

Another aspect of the invention comprises a method of using the device in accordance with a foregoing aspect to hold an object by a person.

Another aspect of the invention comprises a method of using the device in accordance with a foregoing aspect to grasp an object by a person.

Another aspect of the invention comprises a method of using the device in accordance with a foregoing aspect to grasp an object by a person. The method comprises the steps of gripping the handle by the person and by securing the appendages about the object for gripping engagement of the object by the appendages.

In addition to the aforementioned aspects and features of the present invention, it should be noted that the present invention further encompasses the various possible combinations and subcombinations of such aspects and features. Thus, for example, any aspect may be combined with an aforementioned feature in accordance with the present invention without requiring any other aspect or feature.

BRIEF DESCRIPTION OF THE DRAWINGS

With reference now to the drawings, the following is a brief description thereof.

DETAILED DESCRIPTION

Figure 1:
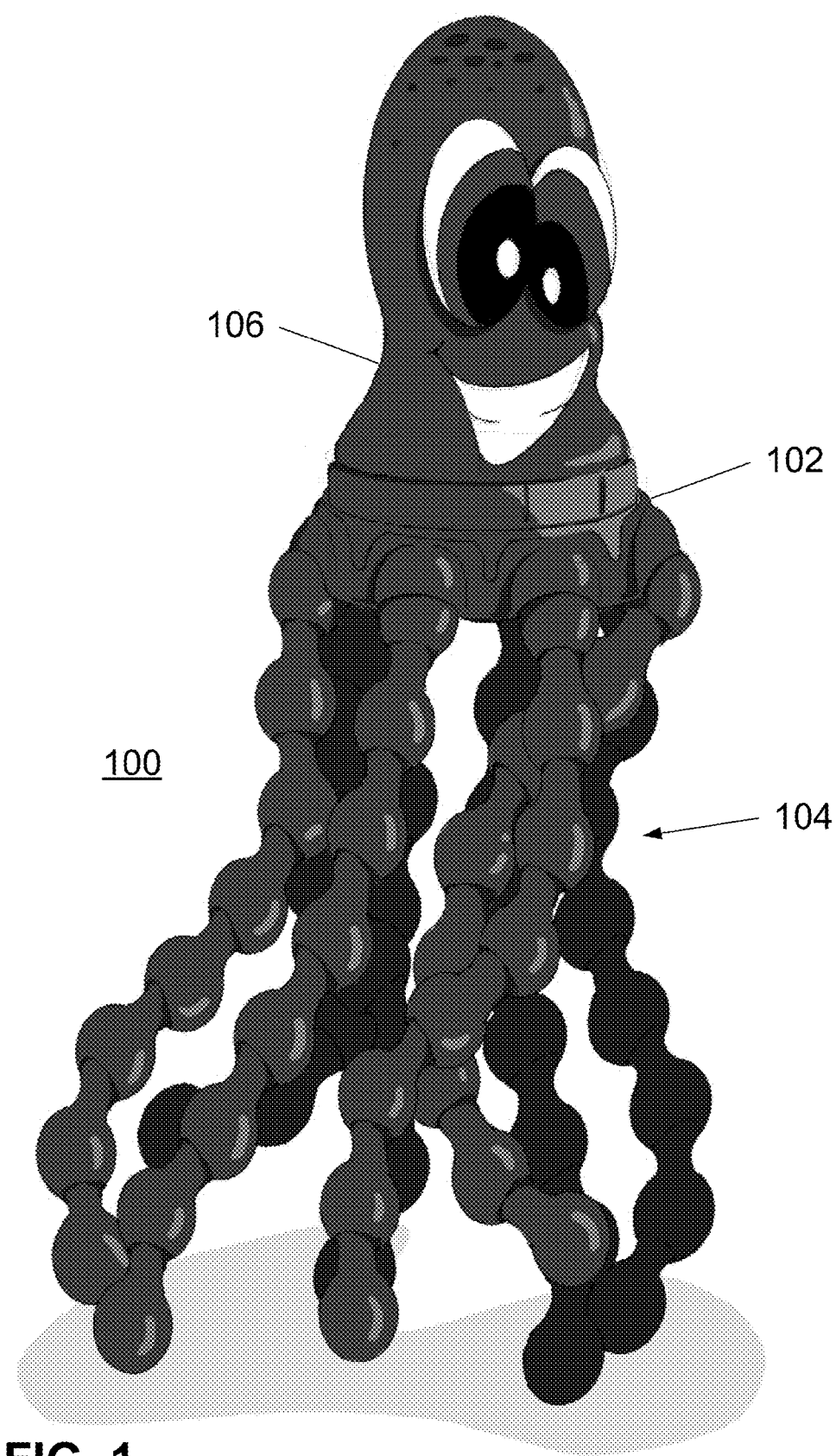
FIG. 1 is a perspective view of a preferred embodiment of a multi-appendage device for holding and gripping an object in accordance with one or more aspects and features of the invention.

As a preliminary matter, it will readily be understood by one having ordinary skill in the relevant art ("Ordinary Artisan") that the present invention has broad utility and application. As should be understood, any embodiment may incorporate only one or a plurality of the above-disclosed aspects of the invention and may further incorporate only one or a plurality of the above-disclosed features. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. As should be understood, any embodiment may incorporate only one or a plurality of the above-disclosed aspects of the invention and may further incorporate only one or a plurality of the above-disclosed features. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Regarding applicability of 35 U.S.C. §112, 16 paragraph (f), no claim element is intended to be read in accordance with this statutory provision unless the explicit phrase "means for" or "step for" is actually used in such claim element, whereupon this statutory provision is intended to apply in the interpretation of such claim element.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is in no way intended to limit the invention, its implementations, or uses.

Turning now to the drawings, FIG. 1 shows a perspective view of a preferred multi-appendage device 100 for holding, gripping, or suspending an object in accordance with one or more aspects and features of the invention. The device 100 comprises a base assembly 101 comprising a body 102 and a plurality of flexible appendages 104 attached to and extending from the body 102. The body 102 preferably is firm and may be formed from a molded plastic case or housing. The body 102 further may comprise an outer resilient material provided, for example, by an elastomeric material molded onto the case or housing.

As further shown in FIG. 1, Each appendage 104 is spaced at generally equal distant to each other appendage 104 adjacent thereto around the body 102. Preferably the plurality of appendages include at least six appendages, and as illustrated consist of eight appendages, and each appendage 104 preferably is structurally the same as each other appendage 104. The device 100 stands on its own on a surface by using some of the appendages 104 as legs, as shown in this drawing.

The device 100 further comprises an add-on component 106 attached to and extending from a top of the body 102. As illustrated, the add-on component 106 resembles a head, and together with the body 102 and appendages 104, the device 100 itself resembles an octopus having eight legs.

In addition to resembling a head, the add-on component 106 preferably serves as handle for grasping and holding the device 100 by a person. In this respect, the add-on component 106 preferably is dimensioned and configured to be grasped by, and fit within the palm of, a person's hand.

Figures 2, 3:
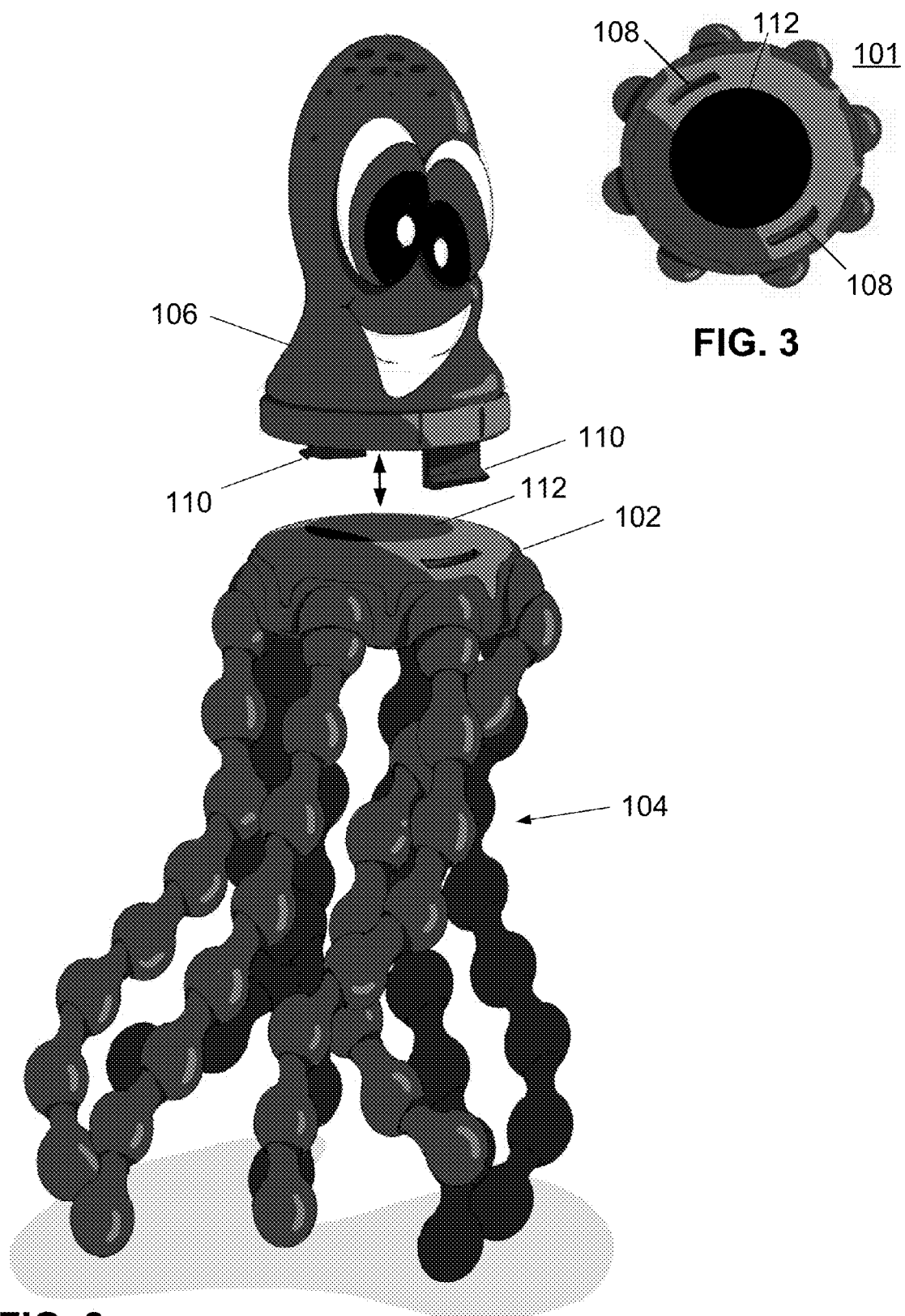
FIG. 2 is a perspective, exploded view of the device of FIG. 1, showing the add-on component detached from the base assembly.
FIG. 3 is a top plan view of the base assembly of FIG. 2.

The add-on component 106 preferably snaps onto the body 102 and is detachable from and reattachable to the body 102, as illustrated in FIG. 2. Slots 108 are provided in the body 102 that receive inserts 110 extending from the add-on component 106 for snapping-on the add-on component 106 to the body 102. The slots 108 are perhaps best seen in FIG. 3, which illustrates a top plan view of the base assembly 101.

As further shown in FIG. 2, the body 102 has a generally flat top wall on which is located a layer of resilient material 112. The layer of resilient material 112 preferably is compressible and, when compressed, seeks to expand back out and decompress. As such, this layer of resilient material 112 preferably is compressed and creates tension against the add-on component 106 when snapped onto the body 102, whereby the add-on component is held in tension against the body 102. Moreover, when the appendages 104 extend from the sides of the body 102 as shown in FIG. 2, the body preferably is dimensioned and configured to be grasped by, and fit within the palm of, a person's hand with the layer of resilient material 112 facing the palm of the hand. The layer of resilient material 112 thus may provide comfort and added grip when so held with a hand. The resilient layer of material 112 may be a molded elastomeric material or a foam material. In some embodiments, a foam pad is adhered to the top of the body and comprises the resilient layer of material.

Figure 5:
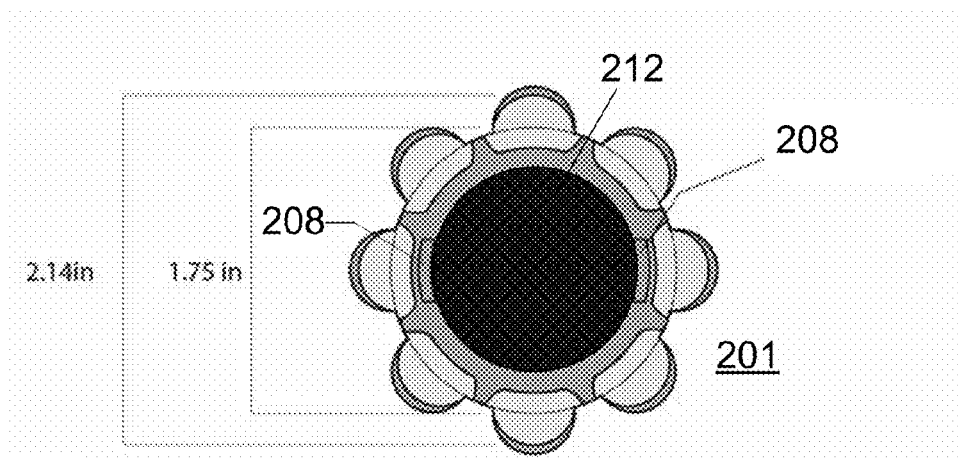
FIG. 5 is top plan view of the base assembly of FIG. 4.
Figure 4:
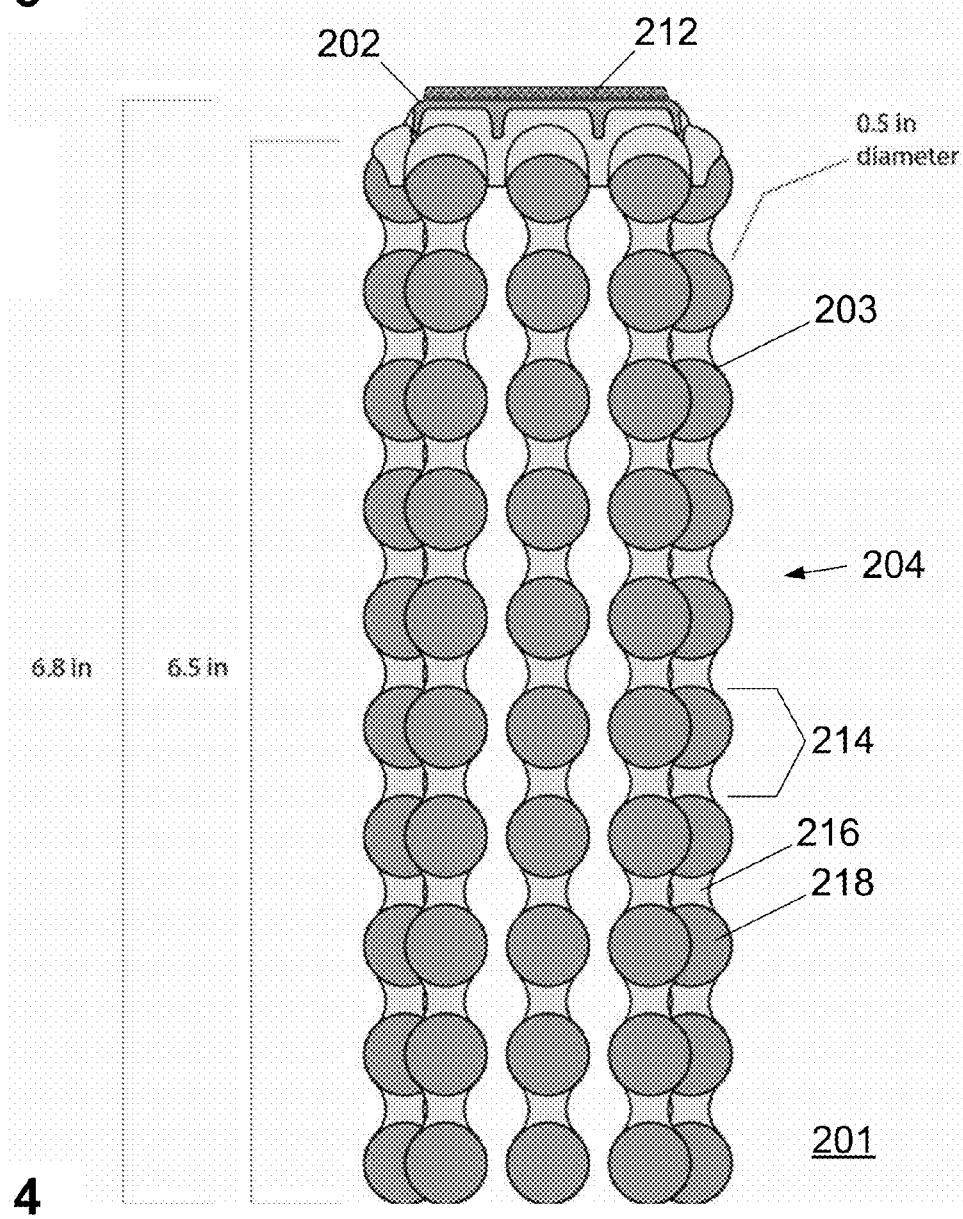
FIG. 4 is a side elevational view of a base assembly of another preferred embodiment of a multi-appendage device for holding and gripping an object in accordance with one or more aspects and features of the invention.

FIG. 4 is a side elevational view of a base assembly 201 of another preferred embodiment of a multi-appendage device for holding and gripping an object in accordance with one or more aspects and features of the invention; and FIG. 5 is top plan view of such base assembly 201. The base assembly 201 and the base assembly 101 are similar in construction, and the following description of the base assembly 201 applies to the base assembly 101.

The base assembly 201 includes a body 202, including the layer of resilient material 212, and a plurality of appendages 204. While an add-on component is not shown, which component is considered to be optional in some embodiments of the invention, the body 202 is shown with slots 208 for receiving interchangeable add-on components, such as add-on component 106 of FIG. 2; add-on component 706 of FIG. 7; add-on component 806 of FIG. 8; and add-on component 906 of FIG. 9.

Each appendage 204 of the base assembly 201 preferably comprises an elongate integral piece of molded material. An exemplary piece 203 of molded material of a respective appendage is called out in FIG. 4, and defines the outer surface of the respective appendage. The molded material preferably is an elastomeric material and preferably defines a resilient outer surface of the respective appendage. As seen in the schematic illustration, the elongate integral piece 203 of molded material generally extends an entire length of the respective appendage. The molded material may comprise a composite material of different elastomeric compositions that are molded or co-molded together in parallel or series. Moreover, the resiliency of each appendage may differ as between the different composite materials that are molded together.

Furthermore, each appendage preferably comprises a sequence of ball-and-arm sections. An exemplary ball-and-arm section 214 is called out in FIG. 4, with arm portion 216 and ball portion 218. Ball portion 218 is shown to have a preferred diameter of one-half of an inch, and the overall length of each appendage is shown to be about six and one-half inches when the ball-and-arm sections are aligned in linear arrangement extending from the body 202. In preferred embodiments the overall length of the appendages are between about six inches and eight inches.

In some embodiments the resiliency of the appendage is generally uniform along the length thereof, while in other embodiments the resiliency differs. For example, the resiliency of the ball portion 218 may be less than the resiliency of the arm portion 216 in each ball-and-arm section 214. In yet other embodiments, the resiliency of the ball portion 218 is greater than the resiliency of the arm portion 216 in each ball-and-arm section 214. Still yet in other embodiments, the proximal end of an appendage is firmer or more rigid than one or more other portions of the appendage, especially where the appendage is attachable, detachable, and reattachable to the body, which features are discussed in greater detail below.

Additionally, as shown in FIG. 4 the length between the top wall of the body 202 and distal end of the appendages 204 is shown to be about six-point-eight inches in length. It will be appreciated from the drawing that each arm section extends between two adjacent ball sections of a respective appendage; and each respective appendage may comprise a sequence of ten ball-and-arm sections.

With reference to FIG. 5, the body 202 is generally circular in a cross-sectional profile that has a diameter of about one-point-seven-five inches; including the profile of the appendages, the diameter is about two-point-one-four inches as shown. In preferred embodiments, the diameter of the circular cross-sectional profile of the body is between about one and one-half inches and about three inches.

Figure 6:
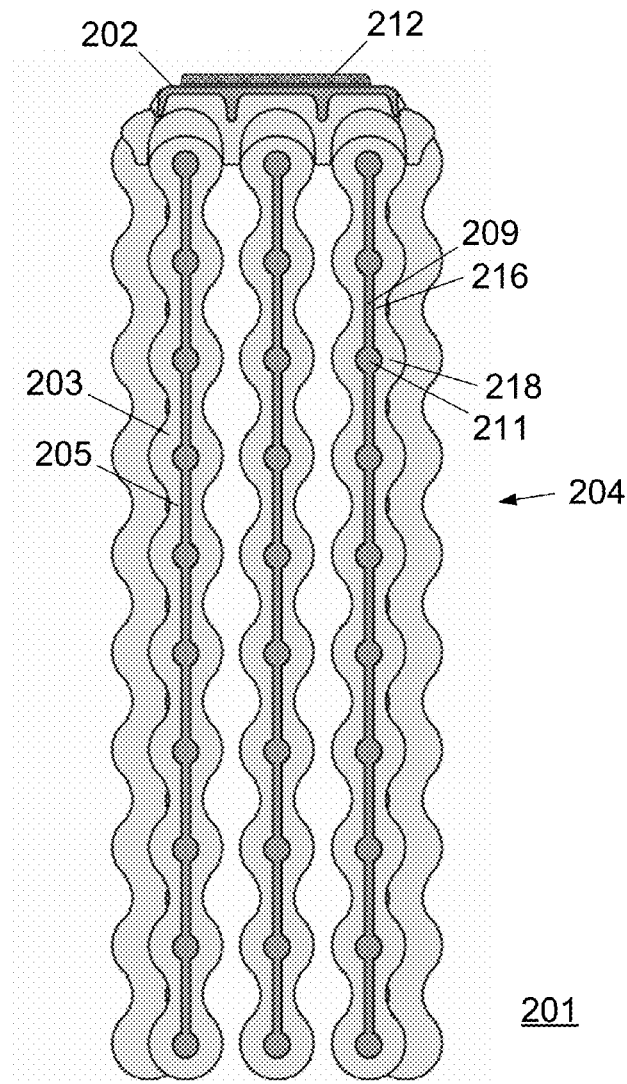
FIG. 6 is another side elevational view of a base assembly similar to that of FIG. 5, wherein three embedded wires of the appendages are schematically illustrated.

FIG. 6 is another side elevational view of the base assembly 201. As perhaps best seen in this drawing, an elongate integral piece 205 of material preferably is located within an interior of—or otherwise embedded in—the elongate integral piece 203 of molded material. The elongate integral piece 205 generally extends the entire length of the appendage. Furthermore, the elongate integral piece 203 of material may be molded about the elongate integral piece 205.

While the elongate integral piece 203 may be generally flexible and inelastic, the elongate integral piece 205 preferably is inelastic. Such elongate integral piece 205 of material may be a wire, a cable, or a rod that is capable of being bent and shaped.

Moreover, as seen in the schematic illustration of three of the embedded wires of the appendages 204 in FIG. 6, each elongate integral piece 205 preferably includes arm portions 209 thereof corresponding to the arm portions 216 of the respective appendage, as well as ball portions 211 thereof corresponding to the ball portions 218 of the respective appendage. Preferably each elongate integral piece 205 is sufficiently flexible and inelastic such that the respective appendage is bendable into various different shapes and is generally inelastic so as to remain in such shape into which it is bent.

Figure 7:
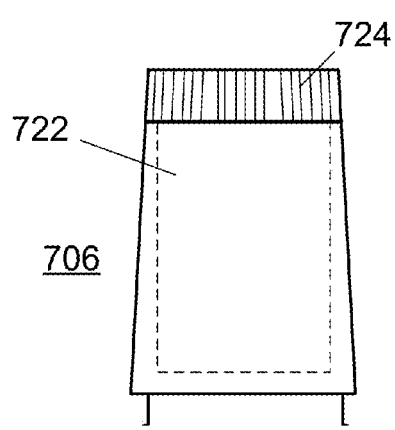
FIG. 7 is a side elevational view of an alternative add-on component in accordance with one or more aspects and features of the invention.
Figure 8:
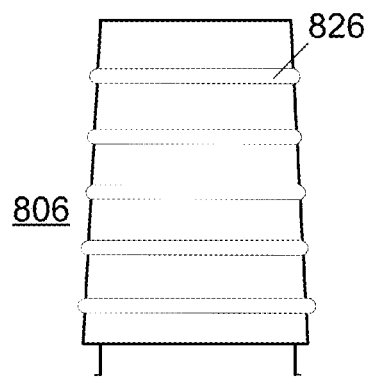
FIG. 8 is a side elevational view of another alternative add-on component in accordance with one or more aspects and features of the invention.
Figure 9:
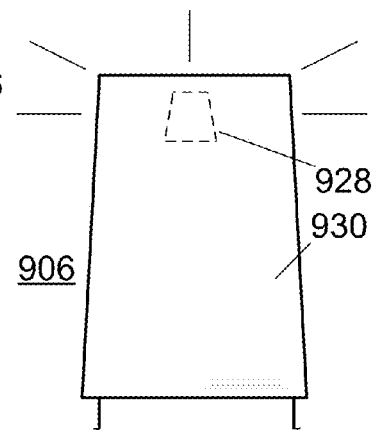
FIG. 9 is a side elevational view of another alternative add-on component in accordance with one or more aspects and features of the invention.

As mentioned above, the body 202 is configured to receive various optional add-on components, including those shown in FIGS. 7-9. With particular regard to such optional add-on components, FIG. 7 is a side elevational view of an alternative add-on component 706 that comprises a storage compartment 722 with lid 724 for closing and securing any item in the storage compartment. The lid 724 may be a screw-on lid or a snap-on lid. Alternatively the add-on component may include a zipper arrangement for closing and securing any item in the storage compartment. Such a zipper arrangement is illustrated, for example, in the Appendix, incorporated herein by reference.

FIG. 8 is a side elevational view of an alternative add-on component 806 that is contoured to serve as a handle and includes ribs (rib 826 being called out in FIG. 8 for illustration) that define finger grips for better grip and hold by a person's hand.

FIG. 9 is a side elevational view of yet another alternative add-on component 906 that comprises a battery-operated light or LED component 928 for illumination. The add-on component 906 includes an overall outer cover 930 that is transparent or translucent, within which the light or LED component 928 is contained.

Preferably, the appendages are detachable from the body and are interchangeable with each other in attachment to the body. For example, each appendage preferably snaps into engagement with the body and, more particularly, a proximal end of each appendage releasably pops into a respective socket of the body. Together, the appendages and body define the base assembly as used herein.

Additionally, the body may include cavities, recesses, or sockets (hereinafter simply referred to as sockets) into which the proximal ends of the appendages are inserted. The sockets may be defined in the body itself, or may be defined in mounting components that form part of the body, in which scenario the remainder of the body is referred to herein as a base component.

Figures 10, 11, 12, 13:
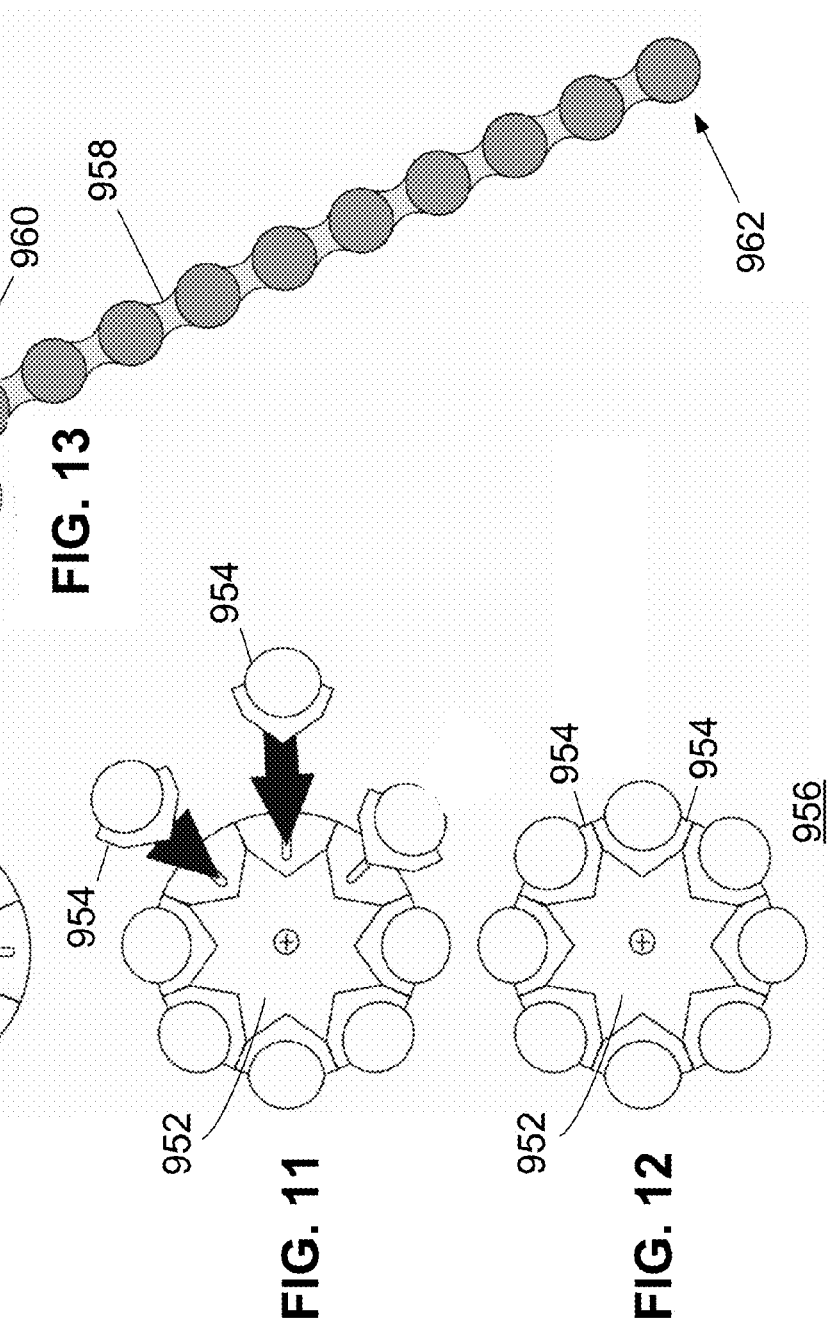
FIG. 10 is a bottom plan view of a base component of another preferred embodiment of a multi-appendage device for holding and gripping an object in accordance with one or more aspects and features of the invention.
FIG. 11 also is a bottom plan view of the base component of FIG. 10 and illustrates the mounting components being mounted to the base component.
FIG. 12 is a bottom plan view of the base component of FIG. 10 after all eight of the mounting components have been mounted to the base component.
FIG. 13 is a bottom plan view of the base component and mounting components of FIG. 12, wherein an appendage has been popped into a socket of one of the mounting components.

Further in regard to this latter feature, FIG. 10 is a bottom plan view of a base component 952 of a body of another preferred embodiment of a multi-appendage device for holding and gripping an object in accordance with one or more aspects and features of the invention; FIG. 11 also is a bottom plan view of the base component 952 of FIG. 10 and illustrates mounting components 954 being mounted to the base component 952; FIG. 12 is a bottom plan view of the body 956 formed by the body component 952 of FIG. 10 after eight mounting components 954 have been mounted to the base component 952; and FIG. 13 is a bottom plan view of the body component 952 and sockets comprising mounting components 954 with recesses, wherein a proximal end 960 of an appendage 958 has been popped into a recess of one of the mounting components 954. In this respect each of the mounting components 954 defines a socket configured and dimensioned to receive a ball-shaped object. Each appendage comprises a ball-shaped proximal end that, preferably, is sufficiently firm and rigid so as to be attached to—and held in attachment to—the body by way of the ball-shaped end being popped into and received within the recess of a mounting component. Each appendage preferably is removably received within a recess of a respective said socket; and each of the plurality of mounting components preferably are detachable and reattachable to the base component of the body, wherein the mounting components may be interchangeable with each other in attachment to the base component.

With regard to the distal ends of the appendages, such as exemplary distal end 962 of the appendage 958 in FIG. 13, the surface of the distal end preferably has a surface with a coefficient of friction sufficient to grip and avoid slipping when the appendage serves as a leg of the device for supporting the device on a surface. In some embodiments, at least one appendage includes a distal end having a suction cup enabling suctioning attachment of the appendage to a surface; in at least some embodiments, at least one appendage includes a distal end having a fastener—such as a clamp or spring-biased clip—enabling fastening of the appendage to an object; and in at least some embodiments, at least one appendage includes a distal end having a magnetic component—such as a magnet—enabling magnetic attachment of the appendage to a surface.

In an exemplary use in accordance with one or more aspects and features of the invention, an object is releasably held by a subset of the appendages that serve as arms, the arms being bent into a shape that grips the object. The arms preferably are wrapped around or otherwise about the object in locking engagement with the object. Another subset of other appendages serve as legs that support the device on a surface.

In another exemplary use, an object is releasably held by a subset of the appendages that serve as arms, the arms being bent into a shape that grips the object. The arms preferably are wrapped around or otherwise about the object in locking engagement with the object. Another subset of other appendages serve releasably mount the device to a structure or other object.

In another exemplary use, an object is releasably held by a subset of the appendages that serve as arms, the arms being bent into a shape that grips the object. The arms preferably are wrapped around or otherwise about the object in locking engagement with the object. Another subset of other appendages releasably suspend the device from a structure or other object.

In another exemplary use, an object is releasably held by a subset of the appendages that serve as arms, the arms being bent into a shape that grips the object, while the device is held with a person's hand. The arms preferably are wrapped around or otherwise about the object in locking engagement with the object. The device may be held by holding the body if no add-on component is included with the device; and the device may be held by holding an add-on component if such component is included with the device, especially where such add-on component is dimensioned and configured to serve as a handle.

The device preferably is used to hold, secure, or mount an object to another object such as, but not limited to, a doorknob; a door overhang; a shopping cart; a pocketbook; a baby car seat; a lamp; a tool; a bumpers; a baby carrier; a baby stroller; a side table; a child's book bag; an adult book bag; a golf bag; a human arm or leg; a belt loop; a belt; a tool belt; a ladder; a table; a chair; a refrigerator door; a cabinet door; a door frame; a door hook; or a door hanger. Objects that can be held include, for example, household electronics, consumer electronics, office electronics, or office supplies, and gadgets. Preferably, the device is capable of suspending an object weighing up to about 10 to 15 pounds (or holding and object equivalent against a force equivalent thereto).

Still yet additional embodiments in accordance with aspects and features of the invention—and uses thereof—are disclosed in the Appendix, which is incorporated by reference herein. Indeed, potential uses further include use with work utility belts in the construction or handyman industries. To this end, an add-on component may comprise a mechanism for attachment of the device to a utility belt, and one or more such exemplary embodiments are disclosed in the Appendix.

As will be appreciated from the foregoing, the device can be attached to just about anything for providing an extra hold, an extra hand, or the ability to hang-up something to almost anything.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention. Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

Indeed, it is contemplated that contexts of implementation and use of embodiments of the invention include use to hold objects in the kitchen, bedroom, bathroom, living room, and office; use to hold objects when traveling; use to hold objects when camping; use to hold objects when working in garage or automotive shop; use to hold objects when working with arts and crafts; use to hold objects in photography; use to hold objects when caring for or attending to infants; and use to hold objects when organizing.

In an exemplary implementation, a florist who needs both hands to complete a flower arrangement can secure the arrangement with one or more embodiments of the invention and have both hands to complete the arrangement. Indeed, one or more embodiments of the invention preferably are light in weight, small, easy to transport, and the appendages can be easily maneuvered or manipulated. The aforementioned florist could use one or more such embodiments on site at a wedding or event without having to transport heavy equipment.

In another exemplary implementation, while shopping one could use one or more embodiments of the invention to secure a drink cup, keys, handbag, and phone all to a shopping cart and continue shopping.

Additionally, it is contemplated that contexts of implementation and use of embodiments of the invention further include use as an extension or aid to one's hand to grasp objects for manipulation thereof, as well as use in physical therapy in the medical context. Indeed, one such use includes use by stroke victims who might otherwise be unable to grasp and hold an object with the fingers but who can grip a device of the invention, the appendages of which grasp and hold the object. It is believed that such use provides a level of independence otherwise unavailable for some stroke victims.

What is claimed is:

1. A multi-appendage device for holding and gripping an object, comprising:
    (a) a body comprising a top wall, a peripheral side wall, and a bottom wall with the body having a cross-sectional profile having a maximum width of between about one and one-half inches and about three inches, whereby the body is configured to be grasped by and fit within the palm of a person's hand with the top wall facing the palm;
    (b) a plurality of flexible appendages attached to the peripheral side wall of the body and each configured to extend away from the body the same maximum extent in an opposite direction to a direction in which the top wall faces,
        (i) wherein each appendage comprises,
            (A) an elongate integral piece of molded material, and
            (B) an elongate integral piece of material comprising an embedded wire, cable, or rod that is located within an interior of the elongate integral piece of molded material, that generally extends the entire length of the appendage, and that is generally flexible and inelastic,
        (ii) wherein each appendage is bendable into various different shapes and is generally inelastic so as to remain in a shape into which it is bent,
        (iii) wherein the entire length of each appendage is between about six inches and about eight inches, and
        (iv) wherein each appendage includes a sequence of ball-and-arm sections, whereby one or more of the appendages are configured to hold an object when the body is grasped by and fits within the palm of a person's hand with the top wall facing the palm; and
    (c) an elongate add-on component releasably attachable to the body and configured to serve as a handle for also grasping by a person's hand, wherein when the add-on component is releasably attached to the body, the add-on component covers the top wall and extends therefrom in the direction in which the top wall faces, with the bottom wall facing in the opposite direction and with the one or more of the appendages extending away from the body in the opposite direction for holding and gripping an object, whereby the elongate add-on component serves as a handle extending oppositely to the one or more of the appendages for holding and gripping the object, and whereby the multi-appendage device serves as a multi-grip extension of the person's hand.

2. The device of claim 1, wherein the elongate integral piece of molded material of each appendage defines a generally resilient exterior outer surface of the appendage.

3. The device of claim 2, wherein each appendage comprises a molded elastomeric surface.

4. The device of claim 1, wherein at least one appendage includes a distal end having a suction cup enabling suctioning attachment of the appendage to a surface.

5. The device of claim 1, wherein at least one appendage includes a distal end having a fastener enabling fastening of the appendage to an object.

6. The device of claim 5, wherein the fastener comprises a clamp.

7. The device of claim 5, wherein the fastener comprises a spring-biased clip.

8. The device of claim 1, wherein at least one appendage includes a distal end having a magnetic component enabling magnetic attachment of the appendage to a surface.

9. The device of claim 1, wherein each respective appendage is detachable from and reattachable to the body by inserting the respective appendage into and withdrawing the respective appendage out of a respective recess of the body that is configured to receive an appendage.

10. The device of claim 1, wherein each appendage snaps into engagement with the body.

11. The device of claim 1, wherein the appendages are detachable from the body and are interchangeable with each other in attachment to the body.

12. The device of claim 1, wherein each appendage is spaced at generally equal distant to each appendage adjacent thereto, and wherein each appendage is structurally the same as each other appendage.

13. The device of claim 1, further comprising a layer of resilient material located on the top wall, wherein the layer of resilient material is compressed between the body and the add-on component when the add-on component is releasably attached to the body such that the add-on component is held in tension when attached to the body.

14. The device of claim 1, further comprising an add-on component attached to the body, wherein the add-on component comprises a storage compartment, and wherein the add-on component comprises a zipper arrangement for closing and securing any item in the storage compartment.

15. The device of claim 1, wherein the body defines an opening into an interior space for receiving an item therethrough and holding the item therein.

16. The device of claim 13, wherein when the elongate add-on component is releasably attached to the body, the add-on component completely covers the layer of resilient material.

17. The device of claim 16, wherein the elongate add-on component comprises finger grips.

18. The device of claim 17, wherein the elongate add-on component comprises a storage compartment.

19. The device of claim 16, wherein the elongate add-on component comprises a storage compartment.

20. The device of claim 1, wherein each appendage is elongate comprising opposite distal and proximal ends, with the distal end being located exterior to the body and with the proximal end being located within a recess defined by the body.

21. A multi-appendage device for holding and gripping an object, comprising:
(a) a body component; and
(b) a plurality of flexible appendages attached to and extending from the body component, wherein each appendage of the plurality of flexible appendages comprises,
  (i) an outer, elongate integral piece of molded material that defines a sequence of alternating ball and arm portions, and
  (ii) an inner, elongate integral piece of material that is located within the outer piece of molded material, that is generally flexible and inelastic, and that defines a second sequence of alternating ball and arm portions, with each ball portion of the second sequence being located within a respective ball portion of the first sequence, and with each arm portion of the second sequence being located within a respective arm portion of the first sequence;
(c) wherein each appendage is bendable into various different shapes and is generally inelastic so as to remain in a shape into which it is bent; and
(d) further comprising a plurality of sockets each defining a recess for receiving a ball-shaped object, wherein each appendage comprises a ball-shaped end, wherein each appendage is attached to the body component by way of the ball-shaped end being received within a recess of a respective said socket, and wherein each of the plurality of sockets is detachable and reattachable to the body component.

22. The device of claim 21, wherein the appendages are interchangeable with each other in attachment to the body component.

23. The device of claim 21, wherein each appendage attached to the body component is spaced at generally equal distant to each appendage adjacent thereto, and wherein each appendage is structurally the same as each other appendage.

24. The device of claim 21, wherein each of the plurality of sockets is detachable and reattachable to the body component along a periphery of a bottom wall of the body component, further comprising a layer of resilient material located on a top wall of the body component.

25. The device of claim 24, further comprising an add-on component that is releasably attached to the body component, wherein the layer of resilient material is compressed between the body component and the add-on component when the add-on component is releasably attached to the body component such that the add-on component is held in tension when attached to the body component.

26. The device of claim 25, wherein the add-on component comprises finger grips.

* * * * *